(12) United States Patent (10) Patent No.: US 11,778,324 B2
Tanaka et al. (45) Date of Patent: Oct. 3, 2023

(54) ABERRATION CORRECTION METHOD, COMPUTER-READABLE STORAGE MEDIUM, AND IMAGE PICKUP APPARATUS

(71) Applicant: CANON KABUSHIKI KAISHA, Tokyo (JP)

(72) Inventors: Hyochoru Tanaka, Tochigi (JP); Toshihiro Okuda, Tochigi (JP); Shu Ito, Tochigi (JP); Toshinori Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/486,688

(22) Filed: Sep. 27, 2021

(65) Prior Publication Data

US 2022/0109793 A1 Apr. 7, 2022

(30) Foreign Application Priority Data

Oct. 2, 2020 (JP) .................................. 2020-167563

(51) Int. Cl.
*H04N 23/68* (2023.01)
(52) U.S. Cl.
CPC ................................ *H04N 23/687* (2023.01)

(58) Field of Classification Search
CPC ............... H04N 5/23287; H04N 5/217; H04N 5/232133; H04N 5/238; H04N 5/3572; H04N 5/23209
See application file for complete search history.

(56) References Cited

U.S. PATENT DOCUMENTS

| 2012/0044369 | A1* | 2/2012 | Irisawa | H04N 5/23287 |
| | | | | 359/554 |
| 2016/0112618 | A1* | 4/2016 | Sugaya | G03B 5/00 |
| | | | | 348/208.5 |
| 2017/0230567 | A1* | 8/2017 | Takao | H04N 5/217 |
| 2019/0089892 | A1* | 3/2019 | Kurisu | H04N 25/704 |
| 2020/0015677 | A1* | 1/2020 | Inoue | A61B 3/1225 |

FOREIGN PATENT DOCUMENTS

| JP | H06110115 A | 4/1994 | |
| JP | 2000214047 A | 8/2000 | |
| JP | 2010141814 A | 6/2010 | |
| JP | 2011215707 A | 10/2011 | |
| WO | WO-2018180730 A1 * | 10/2018 | ........... A61B 3/1025 |

* cited by examiner

*Primary Examiner* — Padma Haliyur
(74) *Attorney, Agent, or Firm* — CANON U.S.A., INC. IP Division (57) ABSTRACT

Provided is an aberration correction method including: picking up images of a particular object at a plurality of focus positions including an in-focus position of the particular object; obtaining an aberration information based on the picked up images; and correcting an aberration based on the aberration information.

19 Claims, 6 Drawing Sheets

ABERRATION CORRECTION METHOD, COMPUTER-READABLE STORAGE MEDIUM, AND IMAGE PICKUP APPARATUS

BACKGROUND OF THE DISCLOSURE

Field of the Disclosure

The aspect of the embodiments relates to an aberration correction method, a computer-readable storage medium, and an image pickup apparatus.

Description of the Related Art

Image pickup apparatus, such as digital single-lens reflex cameras and mirrorless cameras, in recent years are equipped with an image pickup element with an increased number of pixels. Along with the increase in number of pixels of the image pickup apparatus, high optical performance corresponding to the increase in number of pixels is also required of an image pickup optical system. However, the image pickup optical system has an issue in that optical performance is degraded from an initial state (or optical setting value) at the time of manufacturing with time or through endurance after being passed to a user (photographer). To address this issue, in Japanese Patent Application Laid-Open No. H06-110115, there is disclosed a technology of correcting focus by allowing a beam to form an image on sensor photo receptors of a plurality of focus detection sensors with use of apertures and re-imaging lenses, and detecting the beam with use of a photoelectrically converted object signal, to thereby calculate a defocus amount between an imaging plane and an intended focal plane of an image pickup optical system and defocus a focus correcting lens along an optical axis.

However, it is not only focus that changes with time or through endurance, and aberration also changes. In order to bring the optical performance closer to the initial state (or designed optical value) at the time of manufacturing, it is required to correct the aberration.

SUMMARY OF THE DISCLOSURE

A method including: picking up images of a particular object at a plurality of focus positions including an in-focus position of the particular object; obtaining an aberration information based on pickup conditions and the picked up images; and correcting an aberration based on the aberration information.

Further features of the disclosure will become apparent from the following description of exemplary embodiments with reference to the attached drawings.

DESCRIPTION OF THE EMBODIMENTS

Now, an aberration correction method and an image pickup apparatus according to exemplary embodiments of the disclosure are described in detail with reference to the accompanying drawings.

First Embodiment

Now, referring to FIG. 1 to FIG. 5, an image pickup apparatus according to a first embodiment of the disclosure is described. In the first embodiment, a lens-interchangeable camera system is described as an example, but a lens-integrated image pickup apparatus may be adopted instead.

(Configuration of Camera System)

Now, a configuration of a camera system in the first embodiment is described.

Figure 1:
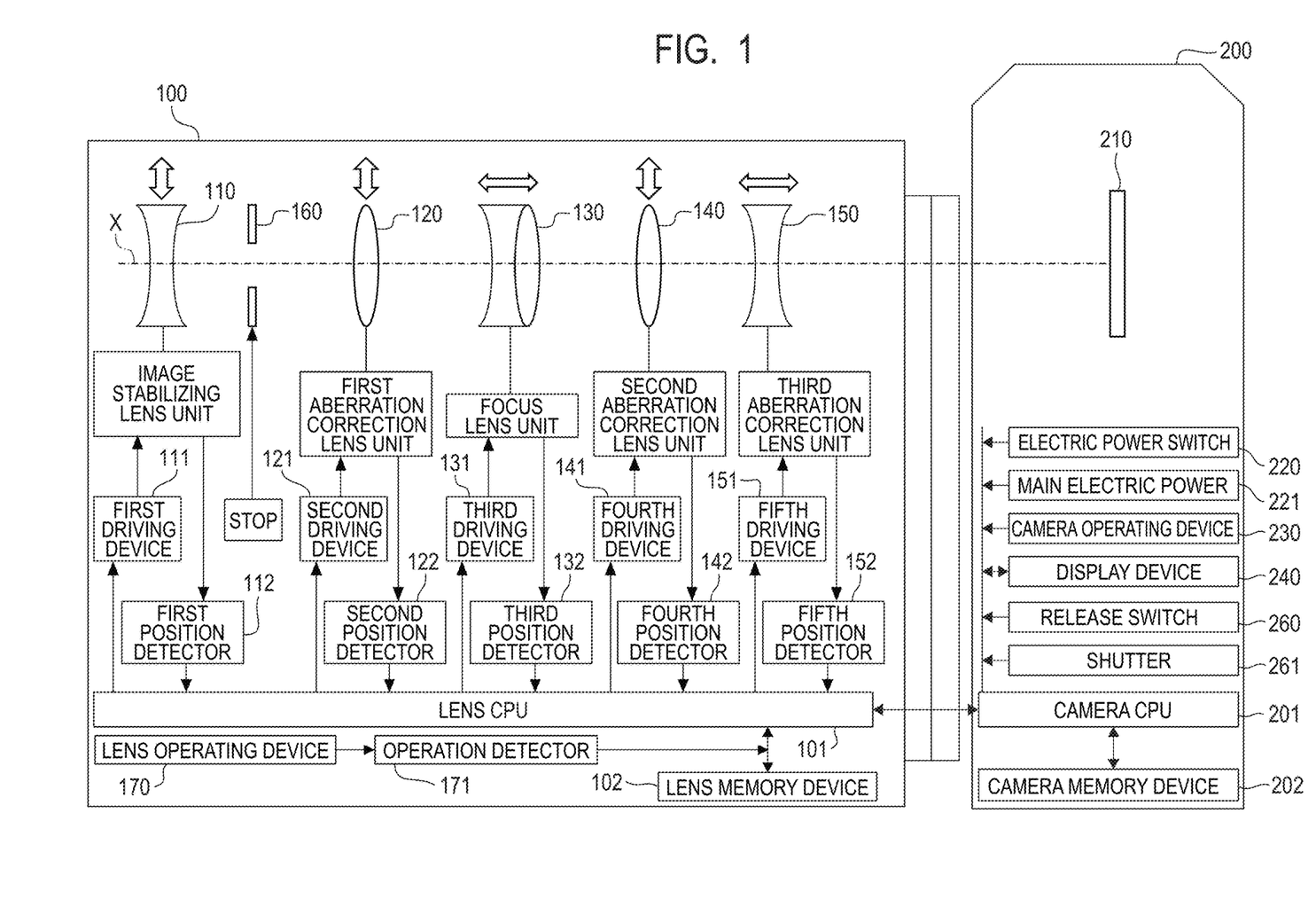
FIG. 1 is a block diagram for illustrating a configuration of a camera system in a first embodiment.

FIG. 1 is a block diagram for illustrating a configuration of the camera system in the disclosure.

The camera system in the disclosure includes a lens apparatus 100, and a camera main body 200 which the lens apparatus 100 is attachable to and detachable from. The camera main body 200 in the first embodiment is a lens-interchangeable image pickup apparatus (single-lens reflex camera or mirrorless camera), but may be a lens-integrated image pickup apparatus.

The lens apparatus 100 includes a plurality of optical systems including an image stabilizing lens unit (image stabilizing mechanism) 110, a first aberration correction lens unit 120, and a second aberration correction lens unit 140, which are movable in an eccentric direction being a direction including a component perpendicular to an optical axis X, a focus lens unit 130 and a third aberration correction lens unit 150, which are movable in an optical axis direction, and a fixed lens unit (not shown).

A first driving device 111 configured to move the above-mentioned image stabilizing lens unit 110, which is movable in the eccentric direction, is, for example, a driving device configured to move a lens holding frame (not shown) holding a lens with respect to a fixed component by thrust generated on the principle of a voice coil motor. A plurality of rolling balls (not shown) are arranged between the lens holding frame and the fixed component so that friction between the components becomes rolling friction. As a result, thrust generated by the principle of the voice coil motor can be transmitted to the lens holding frame with high efficiency. Other examples of the driving device include a piezoelectric element, in which electric power is applied to the piezoelectric element to deform the piezoelectric element, and hence move the lens holding frame with respect to the fixed component.

Driving devices similar to those described above can be given as examples of a second driving device (driving unit) 121 and a fourth driving device (driving unit) 141 for the first aberration correction lens unit 120 and the second aberration correction lens unit 140, which are movable in the eccentric direction, respectively.

The optical systems can be moved in the eccentric direction to correct one-sided defocusing (in a sagittal or meridional plane), coma and other aberration of the lens apparatus 100, thereby being capable of bringing optical performance closer to a target value (setting value).

Examples of a third driving device 131 configured to move the above-mentioned focus lens unit 130, which is movable in the optical axis direction, include an ultrasonic motor unit configured to move on its own by ultrasonic vibration generated from the piezoelectric element. The ultrasonic motor unit is guided, and is configured to move in the optical axis direction. The ultrasonic motor unit is engaged with a focus lens holding frame configured to hold a focus lens by a coupling mechanism (not shown), and the focus lens unit 130 is movable in the optical axis direction together with the ultrasonic motor unit. Other examples of the driving device include a stepping motor, in which a shaft of the stepping motor and the focus lens holding frame are threadedly engaged with a part, and the shaft of the stepping motor is rotated to move the focus lens unit 130 in the optical axis direction.

Driving devices similar to those described above can be given as examples of a fifth driving device (driving unit) 151 for the third aberration correction lens unit 150, which is movable in the optical axis direction.

The optical systems can be moved in the optical axis direction to correct spherical aberration, curvature of field, and other aberration of the lens apparatus 100, thereby being capable of bringing the optical performance closer to a target value (designed value).

Position detectors are mounted to drive the plurality of movable lens units described above to correct positions.

Detection of the positions of the lens units that are movable in the eccentric direction is described. Examples of a first position detector 112 configured to detect the position of the image stabilizing lens unit 110 include a Hall element configured to detect the position using the principle of the Hall effect. Specifically, the Hall element is arranged on the fixed component, and a magnet is arranged on the lens holding frame configured to move eccentrically. An orientation of the magnet is set so as to apply a magnetic field in a direction that is substantially orthogonal to the Hall element. When a magnetic field is applied to the Hall element, a Hall voltage is output. Therefore, with the lens holding frame moving in the eccentric direction, a strength of the magnetic field sensed by the Hall element is changed, and the output Hall voltage is changed. When the Hall voltage is changed, a relative position from a predetermined reference position set in advance (position at which a predetermined Hall voltage value and a predetermined position signal are associated with each other) is obtained. The above-mentioned position detection result is fed back to a lens CPU (controller) 101, which is to be described later, and the image stabilizing lens unit 110 is controlled to move correctly to a target movement amount.

Position detectors similar to those described above can be given as examples of a second position detector 122 and a fourth position detector 142 for the first aberration correction lens unit 120 and the second aberration correction lens unit 140, which are movable in the eccentric direction, respectively.

Detection of the positions of the lens units that are configured to move in the optical axis direction is described. Examples of a third position detector 132 for the focus lens unit 130 include a device configured to calculate the position with a pulse of the stepping motor by open loop control. To that end, a photointerrupter configured to reset the position of the focus lens unit 130 on the fixed component (not shown), and reset the position of the focus lens unit 130 is arranged. As a result, a position reached by moving from a reset position of the focus lens unit 130 with a driving pulse of the stepping motor can be obtained. Other examples of the position detector include a position sensitive detector (PSD) and an encoder. The position sensitive detector is an optical reflection type displacement sensor, and light emitted from a light source is reflected by the moving lens unit and passes through a receiver lens to form an image on the position sensitive detector. An image forming position is changed depending on the position of the lens unit, and hence a relative position from a predetermined reference position can be obtained. The encoder is mainly an optical transmission type displacement sensor, in which a code wheel with slit openings at equal intervals is provided between the light source and the light receiving element to transmit or block light. Therefore, an output signal can be obtained with rotation or movement of the code wheel. Consequently, the code wheel can be fixed to a rotating motor or the moving lens unit to detect the position. Although not required in open loop control by the photointerrupter, a position detection result obtained by other methods is fed back to the lens CPU 101, which is to be described later, to control the focus lens unit 130 to move correctly to a target movement amount.

Examples of a fifth position detector 152 for the third aberration correction lens unit 150 that is movable in the optical axis direction include a position detector similar to those described above.

An aperture 160 changes an amount of light focused on an image pickup element 210, which is to be described later, by rotating an aperture blade by a driving device (not shown) such as a stepping motor to change an aperture diameter. Specifically, a rotation driving force of the stepping motor is transmitted to the aperture blade via a gear part. The gear part has formed therein a cam groove to engage with the aperture blade, and when the gear part is rotated with the rotation driving force of the stepping motor, the aperture blade is rotated to change the aperture.

The lens CPU 101 performs controlling, computing, storing, and the like of the entire lens apparatus 100. Further, the lens CPU 101 communicates to/from a camera CPU (controller) 201 of the camera main body 200 via an electrical contact (not shown). The lens CPU 101 receives an image pickup condition, a drive command, and the like from the camera CPU 201, and transmits various kinds of information, such as lens identification information, focus, image stabilization, the aperture, and a zoom position, to the camera CPU 201. The drive command received from the camera CPU 201 is computed in the lens CPU 101, and is transmitted to each of the driving devices.

A lens operating device 170 refers to an operating device configured to directly or indirectly move optical systems in the lens apparatus 100, such as a zoom ring, a focus ring, or a tilt shift knob (not shown). Examples of an operation detector 171 include a photointerrupter. Rectangular slit portions are formed at equal intervals in an inner peripheral surface of the focus ring, and the rectangular slit portions pass between the light source and the light receiving portion of the photointerrupter to transmit or block light. With the above-mentioned configuration, an output signal can be obtained with rotation of the focus ring, and hence a direction of rotation and an amount of rotation of the focus ring can be detected. Other examples of the operation detector include a position sensor and a potentiometer. A specific example of the position sensor is described. The lens apparatus 100, in which the zoom ring is rotated to move the optical systems in the optical axis direction for magnification varying by mechanical driving or electrical driving, includes a guide barrel having formed therein a straight groove along the optical axis direction of the optical systems, and a cam ring having formed therein a cam groove having an angle with respect to the straight groove in the case of the mechanical driving. An optical system for magnification varying is engaged with the straight groove and the cam groove via a cam follower (not shown), and the cam ring is rotated so that the optical system advances and retracts in the optical axis direction for magnification varying. The cam ring has formed therein a cam groove for the position sensor so that a position signal is detected by the position sensor when the cam ring is rotated with the rotation of the zoom ring. Next, a specific example of the potentiometer is described. In a tilt-shift lens allowing tilt-shift photography, each of a tilt control knob and a shift control knob is mechanically coupled to the potentiometer so that rotation of the knobs becomes detectable.

Operation counts of zooming, focusing, tilting, shifting, and the like detected as described above are stored in a lens memory device (memory unit) 102, and when the driving counts exceed respective predetermined counts (for example, first threshold value, second threshold value, third threshold value, and fourth threshold value) stored in advance, there is a concern in that optical performance of the lens apparatus 100 is degraded, and hence notification for prompting a user to carry out aberration correction is provided. Details of the predetermined counts and a notification method are described later with reference to a flow chart of FIG. 5.

Optical information of each of the optical systems forming the lens apparatus 100 is stored in the lens memory device 102. The optical information means an optical setting value regarding a relationship between movement amounts of the first aberration correction lens unit 120, the second aberration correction lens unit 140, and the third aberration correction lens unit 150 and an aberration correction amount. The above-mentioned optical information contains information for each of the zoom position and an aperture value of the lens apparatus 100, and also contains information on aberration that can be corrected by each of the three movable lens units described above. Further, an optical setting value or initial optical performance information (optical performance information at the time of manufacturing) of the lens apparatus 100 is also stored in the lens memory device 102.

The camera main body 200 includes the image pickup element 210 which photoelectrically converts an optical image of an object, which has been formed by an image pickup optical system. Examples of the image pickup element 210 include CCD and CMOS sensors. The camera system can take (record) a still image and a moving image.

The camera CPU 201 mounted in the camera main body 200 performs, similarly to the lens CPU, controlling, computing, storing, and the like of the entire camera main body 200. The camera CPU 201 communicates to/from the lens CPU 101 via the above-mentioned electrical contact (not shown) to transmit the drive command and various kinds of information to the lens apparatus 100, and receive a state of the lens apparatus 100. A specific example of the drive command includes automatic focusing (AF). A distance to the object is determined by a phase difference detection method or a contrast detection method (not shown), and the drive command is transmitted to the lens CPU 101. The lens CPU 101 computes the drive command and the position information of the focus lens unit 130 determined by the third position detector 132 to move the focus lens unit 130 to an in-focus position for focusing.

The camera main body 200 includes an electric power switch 220, which is a switch that can be operated by the user. A main electric power 221 can be turned ON with the operation of the electric power switch 220 to start the camera main body 200 and supply power to the driving devices in the lens apparatus 100.

The camera main body 200 includes the camera CPU 201 and a release switch 260, which is used when a still image is to be picked up. The release switch 260 has different functions depending on a pressing stroke: AF when the release switch 260 pressed half-way, and a shutter 261 is released when the release switch 260 is fully pressed. Further, such functions assigned to the release switch 260 can be customized through settings in the camera main body 200. A signal from the release switch 260 is input to the camera CPU 201.

The camera main body 200 starts ranging when the release switch 260 is pressed half-way to execute AF. Substantially at the same time, a brightness of the object is measured by a photometric sensor (not shown) or the image pickup element 210 to determine exposure. The exposure is determined based on the brightness of the object, and settings of an aperture value of the aperture 160, a shutter speed, and an ISO sensitivity. When the release switch 260 is fully pressed under a state in which AF is executed and the exposure is determined, still image pickup is started. The image pickup element 210 receives light that has passed through the lens apparatus 100 to perform photoelectric conversion of an object image. A picked up image signal from the image pickup element 210 is converted to digital by a signal processing unit in the camera CPU 201, and is further subjected to various kinds of correction processing to be output as an image signal.

The camera main body 200 includes a display device (display unit) 240. Specifically, the camera main body 200 is equipped with a liquid crystal screen on a back surface of the camera, and can display settings of the camera main body 200, settings of the lens apparatus 100, the picked up image, an error at the time of operation, and the like. An electronic viewfinder and the like are also included in the display device 240.

The camera main body 200 includes a camera operating device 230, through which the settings of the camera main body 200, the settings of the lens apparatus 100, and the like can be changed. Specific examples include operation buttons.

The camera main body 200 includes a camera memory device 202, and can store information of the camera main body 200. Specific examples of the information include functions of the camera main body 200, image correction processing, and a count of operations in which the shutter 261 is released (count of shutter operations).

(Correction of Optical Performance by User)

Now, correction of optical performance by the user in the first embodiment is described.

Figure 2:
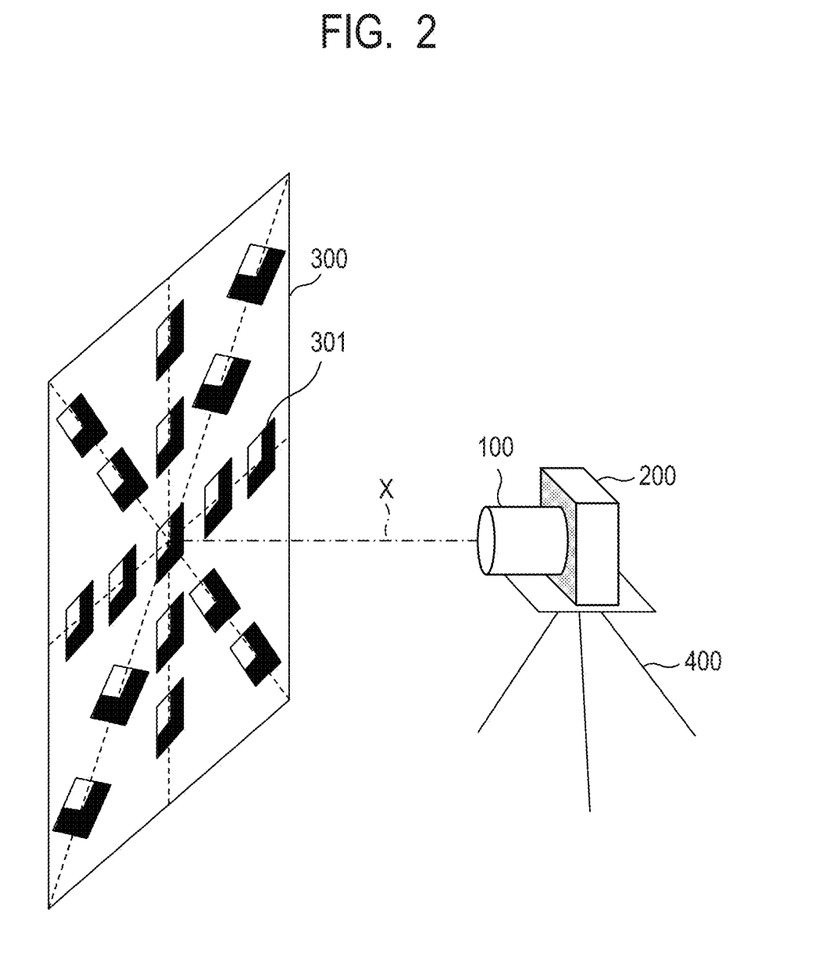
FIG. 2 is a view for illustrating setting of an analysis chart and the camera system at the time of image pickup for optical performance correction in the first embodiment.

FIG. 2 is a view for illustrating setting of an analysis chart 300 and the camera system at the time of image pickup for optical performance correction in the disclosure.

Figure 3:
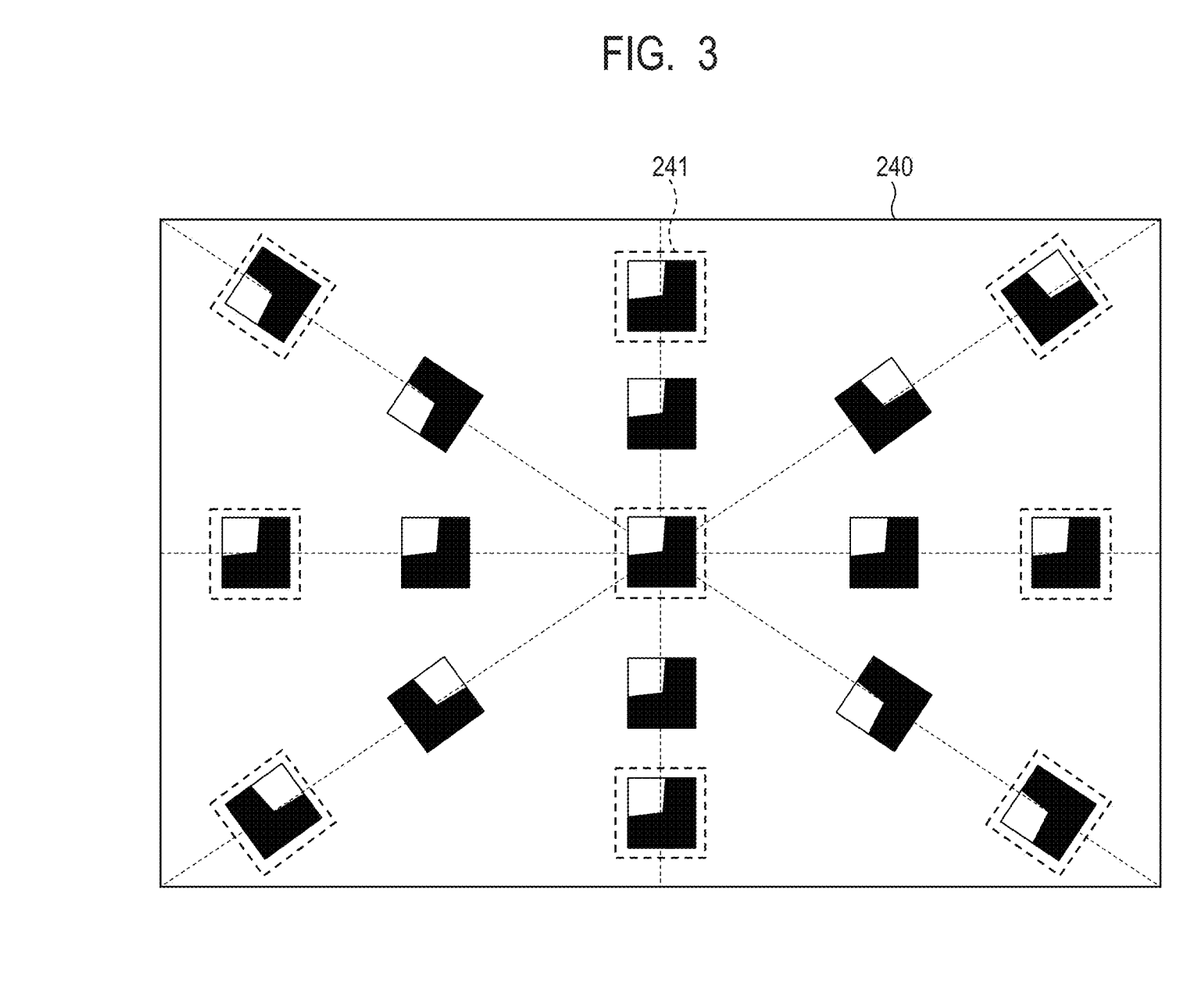
FIG. 3 is a view for illustrating a camera display device showing assist frames inside which marks of the analysis chart in the first embodiment are to fit.

FIG. 3 is a view of the display device 240 of the camera, which includes assist frames 241 inside which, when an image of the analysis chart 300 in the disclosure is taken by the camera system in the disclosure, marks 301 in the picked up image are to fit.

In order to quantify degradation of optical performance of the lens apparatus 100 with time or through endurance, the user carries out image pickup for analysis, and analysis is performed in the camera main body 200 to determine an MTF characteristic. The analysis chart 300 is used for the image pickup for analysis carried by the user. The analysis chart 300 has a rectangular shape, and has a plurality of marks 301 arrayed evenly from the center of the analysis chart 300 toward the periphery on straight lines in vertical directions, horizontal directions, and diagonal directions, each of the marks 301 having two straight line portions (first straight line portion and second straight line portion, respectively) that are inclined by a predetermined angle (first angle), for example, 2° from lines parallel and perpendicular to the vertical directions, the horizontal directions, and the diagonal directions (see FIG. 2 and FIG. 3). The analysis chart 300 is packed with the lens apparatus 100 at the time of purchase of the lens apparatus 100. The analysis chart 300 is affixed to a vertical surface, for example, a substantially flat wall of a room, and a height of a tripod 400 is adjusted so that the height of an optical axis of the camera system (camera main body 200 having the lens apparatus 100 attached thereto) fastened to the tripod 400 is substantially at the same height as the center of the analysis chart 300.

In order to correctly evaluate a degree of degradation of the optical performance of the lens apparatus 100, the marks 301 of the analysis chart 300 is correctly arranged. The assist frames 241 serving as an index of the correct arrangement are displayed in the display device 240 (see FIG. 3). The assist frames 241 are displayed at a total of nine positions including the center, top, bottom, left, right, and diagonal, and when an image is taken with the marks 301 of the analysis chart 300 fitting inside the assist frames, correct analysis of optical performance can be carried out.

Figure 4:
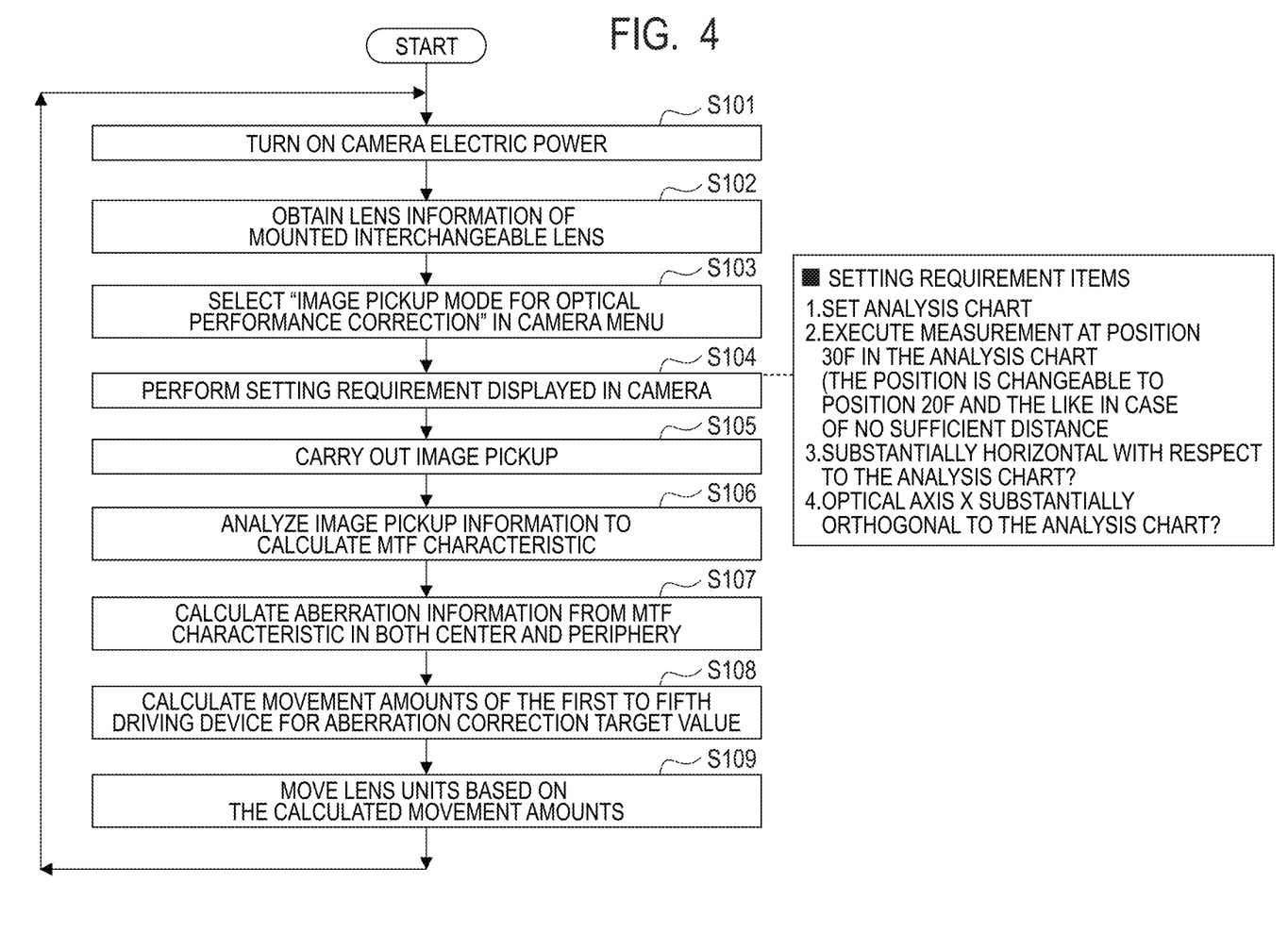
FIG. 4 is a flow chart of correction of optical performance in the first embodiment.

FIG. 4 is a flow chart of the correction of the optical performance in the disclosure.

A flow up to quantification of the degradation of the optical performance of the lens apparatus 100 with time or through endurance, and the correction of the optical performance are described with reference to the flow chart (see FIG. 4).

In Step S101, the user turns ON the electric power switch 220 of the camera main body 200 to start the camera main body 200 and supply power to the lens apparatus 100.

In Step S102, the camera main body 200 obtains lens information on specifications and optical information of the lens apparatus 100 from the lens CPU 101.

In Step S103, the user selects an "image pickup mode for optical performance correction" in a menu displayed on the display device 240 of the camera with use of the camera operating device 230.

In Step S104, the user performs setting in accordance with setting requirement items displayed in order on the display device 240 of the camera. In the setting requirement items, the analysis chart 300 is first affixed to the wall. Next, a distance from the analysis chart 300 to the image pickup element 210 of the camera main body 200 is set to a first distance, for example, 30×f where "f" represents a focal length. When the lens apparatus 100 is a telephoto lens, the setting of the "image pickup mode for optical performance correction" is changed from 30×f being the first distance to 20×f or 10×f on the menu of the camera main body 200. Next, an optical axis of the lens apparatus is set to a horizontal state with use of a level gauge included in the tripod, or a level gauge function using a gyro sensor (not shown) mounted in the camera main body 200. Then, a surface of the analysis chart 300 is set to be substantially perpendicular to the optical axis of the lens apparatus 100, and the marks 301 of the analysis chart 300 are fit into the assist frames 241 as illustrated in FIG. 3. As a result, the surface of the analysis chart 300 and the optical axis can be set to a substantially perpendicular state, and the center of the analysis chart 300 and the position of the optical axis can be set to be aligned.

In Step S105, the user fully presses the release switch 260 to carry out still image pickup in the "image pickup mode for optical performance correction." A specific example of an image pickup condition in the "image pickup mode for optical performance correction" is described. Image pickup conditions (aperture value, ISO sensitivity, and shutter speed) determining the exposure of the camera main body 200 and the lens apparatus 100 are automatically set so that the exposure is set appropriately in the camera. For example, settings are automatically performed so that an aperture value approaches a value corresponding to an open state, an ISO sensitivity approaches 100, and the shutter speed approaches to an appropriate exposure depending on an object brightness. The above-mentioned image pickup conditions can be changed suitably by the user from the menu of the camera main body 200. Further, at the time of image pickup, images are picked up while shifting the in-focus position forward or backward by a predetermined amount from a state of being focused on the center of the analysis chart 300. The above-mentioned predetermined amount by which the in-focus position is shifted is an amount that is larger than a deviation amount of the in-focus position between the center (on the optical axis) and the periphery. Through the image pickup at a plurality of focus positions while shifting the in-focus position forward or backward, image forming positions of the center and the periphery on the image pickup element 210 can be obtained, and the type of the aberration and an aberration amount can be obtained. Further, at each in-focus position (focus position), images are picked up while reducing the aperture of the aperture from the open state to F8, and then to F16. Through the image pickup while reducing the aperture diameter of the aperture, whether there is a change in occurrence of the aberration and an amount of change can be known from the change in aperture diameter, and the type of the aberration can be identified. Further, when the lens apparatus is a zoom lens, and when it is required to determine aberration information, the aberration information can be obtained by taking images while changing the zoom position so that a focal length is at a telephoto end, an intermediate zoom position, a wide-angle end, and other positions. Still further, when images are picked up while changing the zoom position, the setting in accordance with the setting requirement items performed in Step S104 can be performed as required.

In Step S106, the camera CPU 201 analyzes information on the image pickup carried out in Step S105 to calculate an MTF characteristic of the lens apparatus 100. Specifically, MTF characteristics in the center and the periphery at each in-focus position are calculated by an SFR computation method (see ISO 12233).

In Step S107, the camera CPU 201 calculates aberration information based on the MTF characteristics in the center and the periphery. The aberration information means the type of the aberration and the aberration amount. The aberration amount can be calculated, based on the MTF characteristics in the center and the periphery, from a deviation of the in-focus position and a driving amount of the second driving device 121. The type of the aberration is also determined using the MTF characteristics in the center and the periphery (left, right, top, bottom, and diagonal). For example, when a peak position of the MTF characteristic in the left side as viewed from the object side is on an image plane side, a peak position of the MTF characteristic in the right side as viewed from the object side is on an object side, and a peak position of the MTF characteristic in the center as viewed from the object side has a small change, it can be determined in the camera CPU 201 that one-sided defocusing has occurred. When the type of the aberration and the aberration amount, which are the aberration information, are determined, image pickup conditions, such as an aperture value, an ISO sensitivity, the shutter speed, a focal length, and an object distance, are taken into consideration as required.

In Step S108, the camera CPU 201 calculates movement amounts of the respective aberration correction lens units through computation based on the aberration information calculated in Step S107 and the optical information (aberration correction lens unit information) transmitted from the lens CPU 101.

In Step S109, the camera CPU 201 transmits the movement amounts (movement direction and movement amounts) of the respective aberration correction lens units calculated in Step S108 to the lens CPU 101, and moves the aberration correction lens units to correct the aberration.

(Flow of Timing to Correct Optical Performance)

Now, a timing to correct the optical performance by the user in the first embodiment is described.

Figure 5:
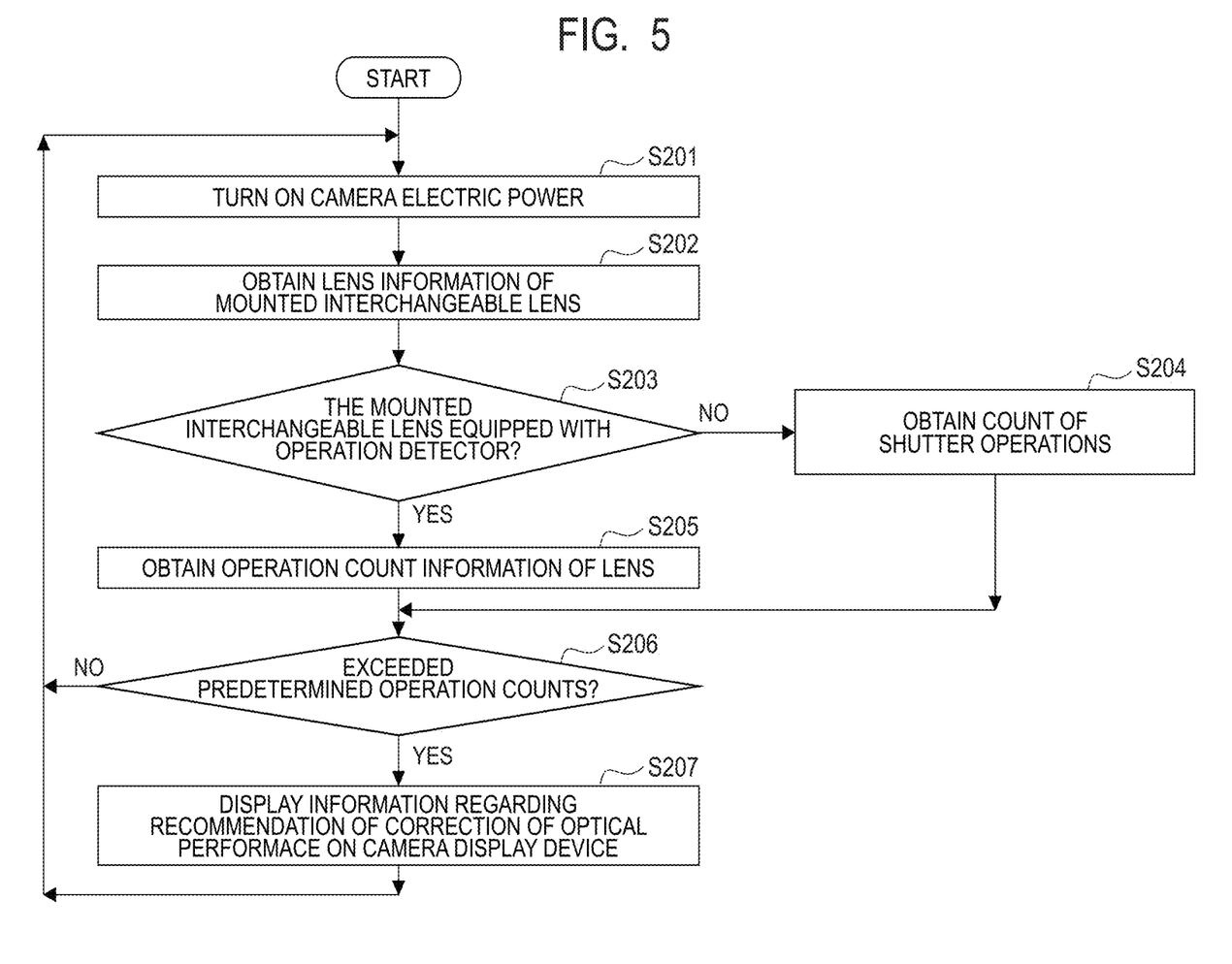
FIG. 5 is a flow chart of a timing to correct the optical performance in the first embodiment.

FIG. 5 is a flow chart of the timing to correct the optical performance in the disclosure.

At which timing to correct the degradation of the optical performance of the lens apparatus 100 with time or through endurance is described with reference to the flow chart of FIG. 5.

In Step S201, the user turns ON the electric power switch 220 of the camera main body 200 to start the camera main body 200 and supply power to the lens apparatus 100.

In Step S202, the camera main body 200 obtains lens information on the specifications and the optical information of the lens apparatus 100 from the lens CPU 101.

In Step S203, the camera main body 200 determines, based on the lens information obtained in Step S202, whether the mounted interchangeable lens apparatus 100 is equipped with the operation detector 171.

In Step S204, when the lens apparatus 100 is not equipped with the operation detector 171, a count of operations in which the shutter 261 of the camera main body 200 is released is obtained. The count of operations in which the shutter 261 is released is stored in the camera memory device 202.

In Step S205, when the lens apparatus 100 is equipped with the operation detector 171, a driving count of the lens operating device 170 can be obtained from an output of the operation detector 171. The driving count of the lens operating device 170 is stored in the lens memory device 102 as described above.

In Step S206, the camera CPU 201 checks whether the operation count information obtained in Step S204 or Step S205 has exceeded a predetermined operation count. The reason is that, when the operation count is increased, a wear amount is increased and a holding position of the lens unit is changed, to thereby lead to degradation of the optical performance. The predetermined operation count means, when the wear amount is estimated in advance based on masses of the respective lens units, and materials and stiffnesses of coupling parts, the cam follower, the cam ring, and the guide barrel configured to hold the lens units in a movable manner, or experiments are conducted on products for consideration, an operation count at the time when the optical performance (aberration amount) is reduced, for example, by ten percent. The predetermined operation count is stored in advance in the lens memory device 102 at the time of manufacturing based on the estimated value at the time of designing or a consideration result of the products for consideration.

In Step S207, when the predetermined operation count is exceeded, the camera CPU 201 displays, on the display device 240 of the camera main body 200, a notification that correction of the optical performance is recommended.

The lens apparatus 100 has been described as a zoom lens in the first embodiment, but without limiting thereto, may be a large-diameter single-vision lens, for example, a super telephoto lens.

In the first embodiment, the analysis chart 300 using seventeen marks 301 has been used, but without limiting thereto, the number of marks may be a total of nine: one in the center and eight in the periphery. Alternatively, a larger number of, for example, a total of twenty-seven or thirty-six marks 301 may be arranged between the center and the outermost periphery.

In the first embodiment, the analysis chart has been used at the time of the image pickup for optical performance correction, but without limiting thereto, a flat wall surface of a high-rise building may be used, for example.

In the first embodiment, the timing to correct the optical performance has been determined based on the operation count of the lens operating device 170 or the operation count of the shutter 261 from the viewpoint of elapsed time or endurance, but the disclosure is not limited thereto. For example, the lens apparatus 100 may be equipped with an acceleration sensor, and when the electric power switch 220 of the camera main body 200 is ON, and when the acceleration sensor outputs an acceleration of a predetermined threshold value or more, the notification that the correction of the optical performance is recommended may be displayed to the user. An acceleration value that is equal to or more than the predetermined threshold value is different depending on the mass and other specifications of the lens apparatus 100. The acceleration value calculated in consideration of the mass of the lens apparatus 100 and the optical information, or an acceleration value obtained as a result of experiments conducted on the products for consideration is stored in the lens memory device 102 at the time of manufacturing.

According to the first embodiment, in the image pickup apparatus configured to correct the optical performance actively by moving the lens units with use of the electric driving devices, the change in optical performance with time or through endurance can be accurately corrected to maintain high image quality.

Second Embodiment

Figure 6:
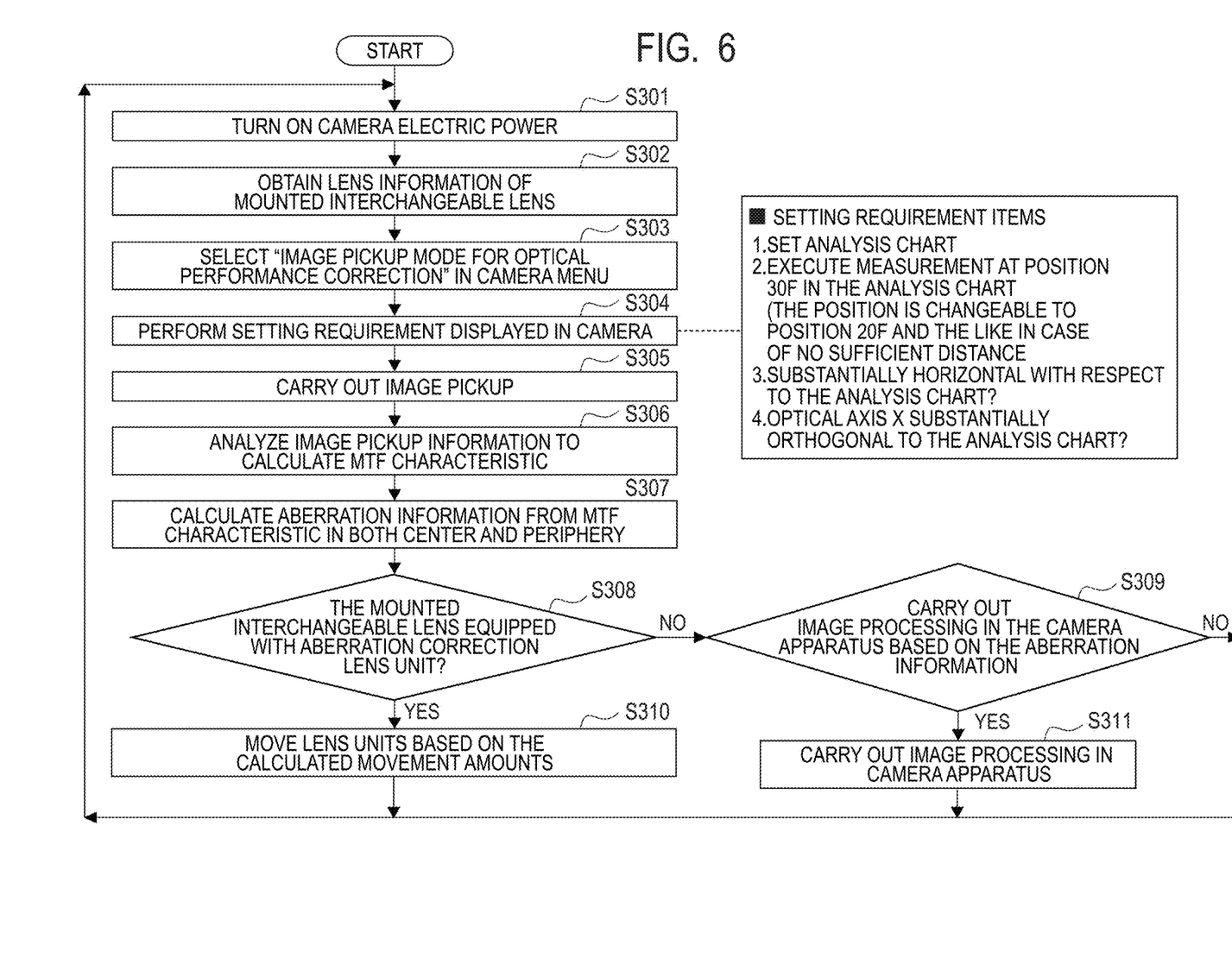
FIG. 6 is a flow chart of aberration correction using image processing in a second embodiment.

Now, referring to FIG. 6, an image pickup apparatus according to a second embodiment of the disclosure is described. In the second embodiment, a lens-interchangeable camera system is described as an example, but a lens-integrated image pickup apparatus may be adopted instead.

In the first embodiment, description has been given of an embodiment in which image pickup data for analysis is analyzed in the camera main body 200, degradation of optical performance of the lens apparatus 100 is quantified, and the aberration correction lens units are moved to correct the optical performance. In the second embodiment, description is given of a flow of processing of aberration correction in a case in which the lens apparatus 100 is not equipped with the aberration correction lens units in Step S108 of FIG. 4 in the first embodiment.

The configuration of the camera system and the settings at the time of the image pickup for optical performance correction are the same as in the first embodiment, and hence description thereof is omitted.

FIG. 6 is a flow chart of aberration correction using image processing.

Step S301 to Step S307 are the same as in the first embodiment described with reference to FIG. 4, and hence description thereof is omitted.

In Step S308, the camera CPU 201 obtains information on whether the mounted interchangeable lens apparatus 100 is equipped with an aberration correction lens unit from the lens CPU 101. When the lens apparatus 100 is not equipped with an aberration correction lens unit, the processing proceeds to Step S309, and when the lens apparatus 100 is equipped with an aberration correction lens unit, the processing proceeds to Step S310.

In Step S309, the user is requested to select whether to correct the aberration using image processing (not shown) installed in the camera main body 200 based on the aberration information calculated in Step S307. The request to the user is made through display on the display device 240 in the camera main body 200.

In Step S310, as in Step S109 in the first embodiment, the aberration correction lens unit is moved to correct the optical performance.

In Step S311, the lens CPU 101 carries out image processing in the camera main body 200 based on the aberration information calculated in Step S307 and the lens information of the lens apparatus 100 to correct the aberration.

In the second embodiment, the image processing has been carried out in the camera main body 200, but without limiting thereto, for example, the aberration information calculated in Step S307 may be stored in the lens memory device 102 of the lens apparatus 100 to add the aberration information to RAW data captured by the lens apparatus 100. The aberration may be corrected more accurately with use of an application specialized in image processing based on the aberration information.

According to the second embodiment, even when the lens apparatus 100 is not equipped with an aberration correction lens unit, the aberration information obtained through the image pickup for optical performance correction and analysis can be used efficiently to correct the aberration of the lens apparatus 100 generated with time or through endurance, and hence maintain high image quality.

Other Embodiments

The disclosure may also be achieved by processing in which a program for achieving one or more functions of the embodiments described above or modification examples is provided to a system or an apparatus through a network or a storage medium, and a computer of the system or the apparatus reads and executes the program. The computer includes one or more processors or circuits, and in order to read and execute computer-executable instructions, may include a network of a plurality of separate computers or a plurality of separate processors or circuits.

The processors or circuits may include a central processing unit (CPU), a microprocessing unit (MPU), a graphics processing unit (GPU), an application-specific integrated circuit (ASIC), or a field-programmable gateway (FPGA). Further, the processors or circuits may include a digital signal processor (DSP), a data flow processor (DFP), or a neural processing unit (NPU).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-167563, filed Oct. 2, 2020, which is hereby incorporated by reference herein in its entirety.

What is claimed is:

1. A method comprising:
obtaining at least one of an operation count information of an operation device for operating an optical system of a lens apparatus, a shutter operation count in a camera apparatus, and an acceleration value of an acceleration sensor;
notifying for prompting to carry out a correction of an aberration of an optical system when the at least one of the operation count information, the shutter operation count, and the acceleration value exceeds a predetermined threshold;
picking up images of a particular object at a plurality of focus positions including an in-focus position of the particular object;
obtaining an aberration information based on pickup conditions of the optical system and the picked up images; and
correcting the aberration of the optical system based on the aberration information.

2. The method according to claim 1, further comprising:
obtaining a movement direction and a movement amount of a correction lens unit based on information on a relationship between a position of the correction lens unit and the aberration, and the aberration information; and
correcting the aberration by controlling driving of the correction lens unit based on the movement direction and the movement amount.

3. The method according to claim 1, further comprising correcting the aberration by performing image processing on the picked up images based on the aberration information.

4. The method according to claim 1, further comprising picking up images of the particular object with a plurality of aperture values at the plurality of focus positions including the in-focus position of the particular object.

5. The method according to claim 1, further comprising picking up images of the particular object with a plurality of focal lengths at the plurality of focus positions including the in-focus position of the particular object.

6. The method according to claim 1, wherein the aberration information includes a type of the aberration, and an amount of the aberration.

7. The method according to claim 2, wherein the correction lens unit includes a lens unit configured to move in a direction perpendicular to an optical axis.

8. The method according to claim 2, wherein the correction lens unit includes a plurality of lens units.

9. The method according to claim 1,
wherein the particular object includes a plurality of marks arrayed on a straight line, and
wherein each of the plurality of marks has a first straight line portion that is inclined by a first angle from a direction parallel to the straight line, and a second straight line portion that is inclined by the first angle from a direction perpendicular to the straight line.

10. A non-transitory computer-readable storage medium storing a program for causing a computer to execute a method, the method comprising:
obtaining at least one of an operation count information of an operation device for operating an optical system of a lens apparatus, a shutter operation count in a camera apparatus, and an acceleration value of an acceleration sensor;

notifying for prompting to carry out a correction of an aberration of an optical system when the at least one of the operation count information, the shutter operation count, and the acceleration value exceeds a predetermined threshold;

picking up images of a particular object at a plurality of focus positions including an in-focus position of the particular object;

obtaining an aberration information based on image pickup conditions of the optical system and the picked up images; and correcting the aberration of the optical system based on the aberration information.

11. The non-transitory computer-readable storage medium according to claim 10, further comprising:

obtaining a movement direction and a movement amount of a lens unit based on information on a relationship between a position of the lens unit and the aberration, and the aberration information; and correcting the aberration by controlling driving of the lens unit based on the movement direction and the movement amount.

12. The non-transitory computer-readable storage medium according to claim 11, further comprising correcting the aberration by performing image processing on the picked up images based on the aberration information.

13. The non-transitory computer-readable storage medium according to claim 11, further comprising picking up images of the particular object with a plurality of aperture values at the plurality of focus positions including the in-focus position of the particular object.

14. An apparatus comprising:

a display unit configured to display a notification for prompting to carry out a correction of an aberration of an optical system when an at least one of an operation count information of an operation device for operating an optical system of the apparatus, a shutter operation count in the apparatus, and an acceleration value of an acceleration sensor exceeds a predetermined threshold value;

a pickup element configured to pick up an image formed by the optical system; and a controller configured to pick up images of a particular object at a plurality of focus positions including an in-focus position of the particular object, obtain an aberration information based on an image pickup condition of the optical system and the picked up images, and correct the aberration of the optical system based on the aberration information.

15. The apparatus according to claim 14, wherein the system includes a lens unit configured to correct the aberration through movement, wherein the apparatus further comprises a driving unit configured to move the lens unit, and wherein the controller is further configured to obtain a movement direction and a movement amount of the lens unit based on information on a relationship between a position of the lens unit and the aberration and the aberration information, and correct the aberration by controlling the driving unit based on the movement direction and the movement amount.

16. The apparatus according to claim 14, wherein the controller is further configured to correct the aberration by performing an image processing on the picked up images based on the aberration information.

17. The apparatus according to claim 15, further comprising a memory unit configured to store the information.

18. The apparatus according to claim 14, wherein the operation device comprises a zoom ring, and wherein the operation count information comprises a zoom driving count.

19. The apparatus according to claim 14, further comprising an image stabilizing mechanism mounted therein.

* * * * *